United States Patent [19]
Steinbrenner et al.

[11] 3,711,162
[45] Jan. 16, 1973

[54] INSTALLATION FOR THE CONTROL OF THE BRAKES OF A VEHICLE

[75] Inventors: Hans Steinbrenner, Stuttgart-W; Hans-Jörg Florus, Goppingen; Horst Grossner, Geradstetten (Wurttemberg), all of Germany

[73] Assignee: Daimler-Benz Aktiengesellschaft, Stuttgart-Unterturkheim, Germany

[22] Filed: March 20, 1970

[21] Appl. No.: 21,339

[30] Foreign Application Priority Data

March 21, 1969 Germany.....................P 19 14 336.3

[52] U.S. Cl. ..............303/21 R, 188/181 T, 303/20, 303/21 CH
[51] Int. Cl. ...............................................B60t 8/00
[58] Field of Search........73/39, 88 R, 100, 131, 133, 73/135; 188/181; 244/111; 303/20, 21, 24; 338/2, 5, 6

[56] References Cited

UNITED STATES PATENTS

| | | | |
|---|---|---|---|
| 2,992,860 | 7/1961 | Hirzel | 303/24 B |
| 3,235,036 | 2/1966 | Meyer et al. | 303/21 P |
| 3,362,757 | 1/1968 | Marcheron | 303/21 P |
| 3,404,758 | 10/1968 | Mortimer | 303/21 CH |
| 3,433,536 | 3/1969 | Skinner | 303/21 A |
| 3,498,683 | 3/1970 | Leiber | 303/21 BE |
| 3,547,499 | 12/1970 | Maskery | 303/21 P |

FOREIGN PATENTS OR APPLICATIONS

| | | | |
|---|---|---|---|
| 988,261 | 4/1965 | Great Britain | 303/21 A |

Primary Examiner—Milton Buchler
Assistant Examiner—Stephen G. Kunin
Attorney—Craig and Antonelli

[57] ABSTRACT

An installation for controlling the brakes of a vehicle, especially for preventing the locking of the wheels, which installation controls the pressure of the brake medium at one or several brakes in dependence on the friction value between the road surface and one or several wheels; a measuring apparatus such as a force-measuring cell or a displacement transmitter is included in the mounting of the brake or brakes or of the brake lining which controls a valve arranged in the line of the brake medium depending on the development of the brake force.

32 Claims, 15 Drawing Figures

INSTALLATION FOR THE CONTROL OF THE BRAKES OF A VEHICLE

BACKGROUND OF THE INVENTION

The present invention relates to an installation for the control of the brakes of a vehicle, especially for the prevention of the locking of the wheels, which controls, in dependence on the friction value between the road surface and one or several wheels, the pressure of the brake medium at one or several brakes.

The known installations of the aforementioned type start with slippage or rotary acceleration of the wheel, and one of these magnitudes or both are utilized for the control. However, it is disadvantageous that these reference magnitudes are only indirect magnitudes whereas the brake force, properly speaking, which acts between the wheel and the road surface and which depends on the prevailing friction value, is not directly determined.

SUMMARY OF THE INVENTION

The present invention aims at avoiding these disadvantages and at creating an installation of the aforementioned type which determines directly the brake force and adapts the same to the friction value between wheel and road surface. The present invention essentially consists of a force measuring cell or displacement transmitter installed into the mounting of the brake or brakes or of the brake lining which controls or control a valve arranged in the line of the brake medium depending on the progress of the brake force. The force-measuring cell thereby detects and determines the brake force directly whereas the displacement transmitter or indicator determines the brake force indirectly by way of the deformation of the mounting that is elastically yielding within certain limits.

It is possible by the use of the same inventive concept to arrange, in an installation of the aforementioned type, a force-measuring cell or displacement transmitter at the wheel support between the wheel or wheels and the vehicle which responds in the horizontal direction and which controls or control a valve arranged in the line of the brake medium dependent on the development or course of the brake force.

In order to enable an advantageous control, the force measuring cell of the displacement transmitter may be connected to a comparator installation which is additionally connected with an installation for detecting the applied brake force. It thereby becomes possible to adapt the applied brake force, i.e., the actuating force of the brake, to the maximum possible brake force between wheel and road surface.

The installation for detecting the applied brake force may consist of an apparatus measuring the reaction force at the fixing or setting of the brake lining. However, it is also possible for the determination of the applied brake force to arrange a conventional pressure transmitter in the brake medium line.

In a simple type of construction of the present invention, a level switch may be connected to the force-measuring cell or the displacement transmitter which is, in turn, operatively connected with the valve. The level switch thereby controls the valve after reaching a threshold which is adjusted to the timely progress of the actual brake force. A pressure decrease in the brake medium line takes place when it is determined by way of the force-measuring cell or the displacement transmitter that the existing brake force is no longer increasing, i.e., the maximum possible brake force is achieved.

In order to create a comparator installation which assures that when the actual brake force, whose maximum value depends on the friction value between wheel and road surface, no longer increases, also the applied brake force can no longer be increased, the level switch may be connected to the input of an AND member controlling the valve arranged in the line of the brake medium, whereby the other input of the AND member is connected with a further level switch which is connected with the installation for detecting the applied brake force. It is thereby achieved that the control responds only when the pressure of the brake medium increases or is constant, but does not respond when the brake pressure decreases. The closing of the valve is also thereby assured during a stronger decrease of the applied brake force.

In order to decrease the number of necessary control cycles and therewith the brake medium rate of flow and in order to also become independent of time constants, the force-measuring cell or the displacement transmitter and the installation for detecting the applied brake force may be connected to a differential amplifier which is connected with the valve by way of the level switch.

It is particularly advantageous if the force-measuring cell or the displacement transmitter and the installation for the detection of the applied brake force are connected to a quotient forming device which is connected with a level switch controlling the valve. The significant advantage achieved by this type of construction is that the formed quotient is independent of the absolute magnitude of the pressures and of the initiated or introduced pressure increase. The control attainable with this type of construction therefore operates equally well with strong and with weak braking and independently of the instantaneous maximum value of the brake force, therefore also of the friction value.

In order to be able to dispense with the use of expensive, rapid control members in all embodiments of the present invention, it is particularly appropriate if at least one differentiator is connected ahead of the level switch or switches. This differentiator or differentiators form the first or also the second derivative of the control magnitude whose course is formed more pronouncedly so that changes in the course of the control magnitude appear more sharply and therewith can be detected more rapidly.

In order to refine the control operation during the pressure build-up and the pressure decrease, two separately controlled valves may be arranged in the line of the brake medium. In all embodiments, two thresholds must then, of course, be provided in the level switches, whereby the lower threshold closes the valve controlling the pressure increase whereas the second higher threshold controls the pressure decrease. The number of control cycles can be decreased thereby whereas one approaches the optimum value more favorably.

Accordingly, it is an object of the present invention to provide an installation for the control of the brakes of a motor vehicle, especially for preventing the locking of the wheels which avoids by simple means the aforementioned shortcomings and drawbacks encountered heretofore.

Another object of the present invention resides in an installation for controlling the brakes of vehicles, particularly for preventing the locking of the wheels thereof which operates in direct dependence on the brake force effective between the wheel and the road surface and the prevailing friction value.

A further object of the present invention resides in an installation of the above-described type which directly detects the brake force and matches the same to the friction value between wheel and road surface.

Still another object of the present invention resides in an installation for controlling the brakes of a vehicle in which the applied brake force is adapted to the maximum possible brake force between wheel and road surface.

BRIEF DESCRIPTION OF THE DRAWING

These and other objects, features, and advantages of the present invention will become more obvious from the following description when taken in connection with the accompanying drawing which shows, for purposes of illustration only, several embodiments in accordance with the present invention, and wherein.

DETAILED DESCRIPTION OF THE DRAWING

Figure 1:
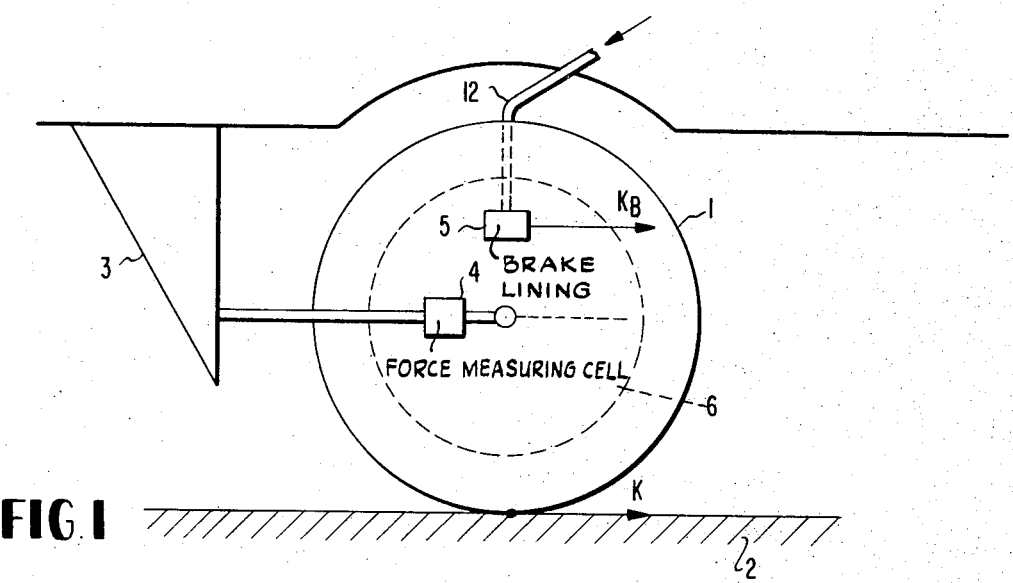
FIG. 1 is a schematic side view of an installation in accordance with the present invention.

Referring now to the drawing wherein like reference numerals are used throughout the various views to designate like parts and more particularly to FIG. 1, reference numeral 1 designates a wheel of a motor vehicle. In order to detect directly the brake force K occuring during the braking between the wheel 1 of a motor vehicle and its road surface 2, a force-measuring cell 4 effective in the horizontal direction and of any conventional construction is arranged between the wheel 1 and its horizontal mounting or support 3. This force-measuring cell 4 which is of a conventional construction and forms no part of the present invention, detects directly the value of the occurring brake force K during the actuation of the brake, i.e., when the brake lining 5 is pressed against the brake disk 6. Since the wheel support 3 generally has a certain elasticity, it is also possible without any difficulty to arrange instead of a force-measuring cell 4 a conventional displacement indicator or transmitter which detects the occurring deformations that represent also directly the magnitude of the actual brake force K.

Figure 2:
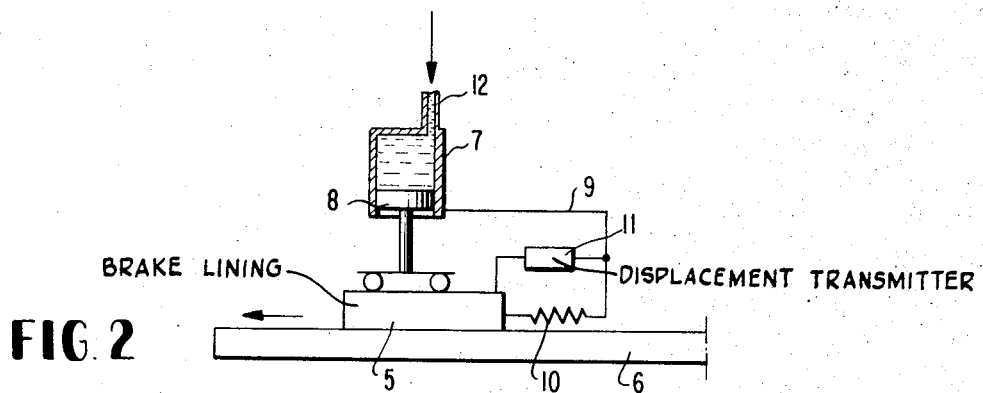
FIG. 2 is a schematic view of a second embodiment of an installation in accordance with the present invention.

In the embodiment according to FIG. 2, the actually occurring brake force K which depends on the friction value between the wheel 1 and the road surface 2 is also directly detected. The brake lining 5 is adapted to be pressed against the brake disk 6 by a brake piston 8 arranged in a brake cylinder 7 and is displaceably supported or mounted with respect to the brake piston 8. The brake lining 5 is secured at a mounting 9 by way of a spring 10. During a braking operation, the deformation of the spring 10 which is measured by a conventional displacement transmitter 11 represents a measure for the brake force K actually occurring between the wheel 1 and the road surface 2. If one proceeds from the simplification that the wheel 1 and brake disk 6 are without mass, then the spring 10 is deflected only by the brake force K between wheel 1 and road surface 2 acting in a tangential direction independently of the applied brake force. A force-measuring cell may also be arranged in the place of the displacement transmitter 11 and of the spring 10 which retains the brake lining 5. Therebeyond, it is also possible to mount the entire brake inclusive of the brake cylinder by way of a spring and a displacement transmitter or a force-measuring cell at a suitable mounting. In order to adapt the brake force $K_B$ applied by the driver to the maximum possible brake force K between wheel 1 and road surface 2, or stated more accurately, in order to match with each other the brake moments, an installation for detecting the applied brake force $K_B$ must be provided. For that purpose, for example, the reaction force at the setting of the brake lining 5, for example, in the brake jaw, may be measured directly. However, it is also possible without any difficulty to detect the pressure in the brake medium line 12 whereby conventional pressure transmitters of different systems may be utilized. This is possible since the friction value between the brake lining 5 and brake disk 6, especially in modern brakes, is independent both as to time and velocity at least in the dry condition.

Figure 3:
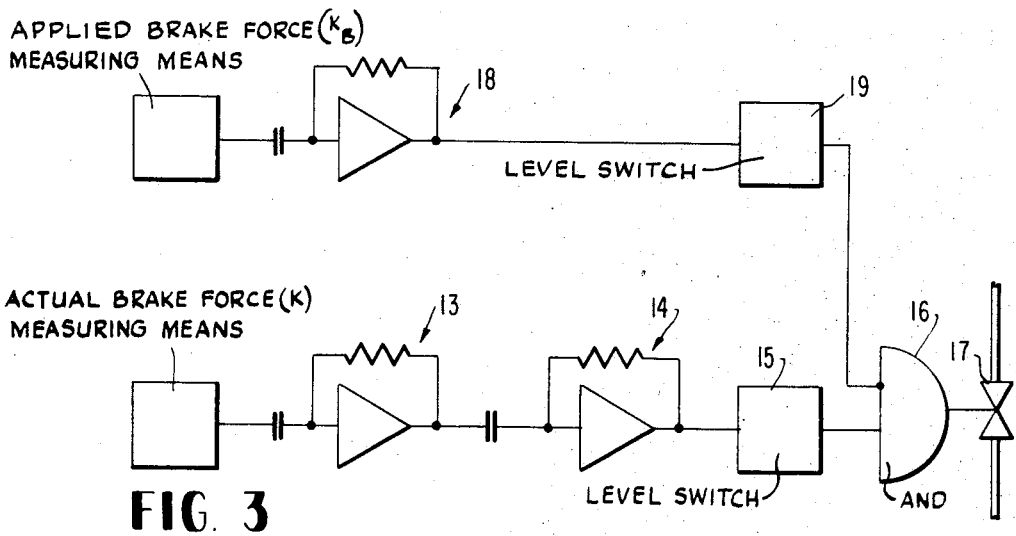
FIG. 3 is a schematic diagram illustrating the construction and arrangement of control members in an installation according to the present invention.
Figure 4:
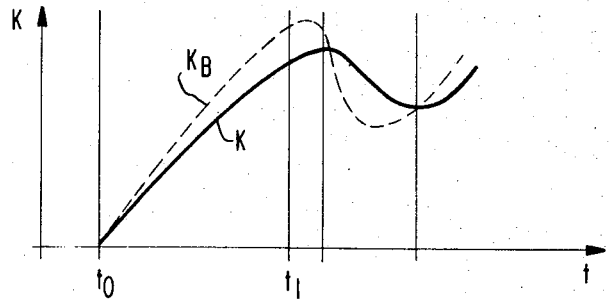
FIGS. 4 through 6 are diagrams illustrating the course of the control magnitudes and their first and second derivatives.
Figure 5:
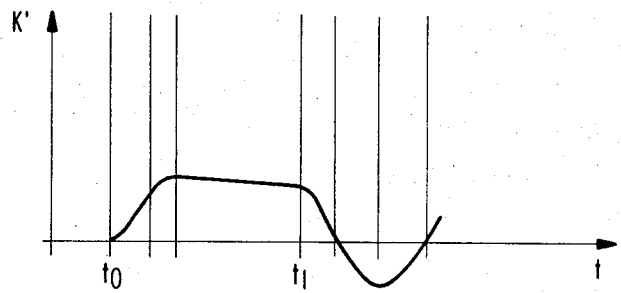
Figure 6:
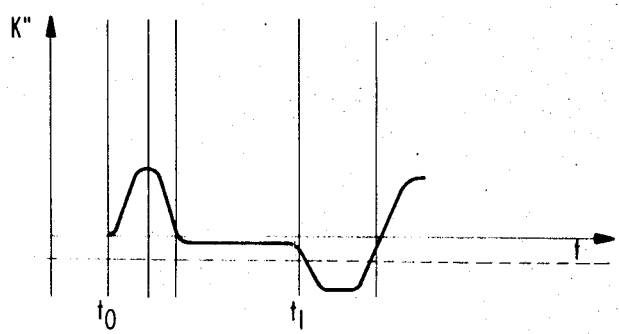

A simple type of construction for the control of the brake force K is illustrated in FIG. 3. The measured brake force K is at first differentiated twice by means of two conventional differentiators generally designated by reference numerals 13 and 14. The curve of the control magnitude K is illustrated in FIG. 4, the curve of the first derivative K' in FIG. 5 and the curve of the second derivative K'' in FIG. 6. From the second differentiator 14, the control magnitude K'' is transmitted to a level switch 15 of any known, conventional construction, at the output of which appears a signal if the second derivative K'' of the control magnitude exceeds a negative threshold S. If the brake is actuated from the moment $t_0$ and the brake pressure increases continuously, then the actual brake force K follows, only with small differences which are caused, for example, by the slight normal slippage, to the applied brake force $K_B$ up to a moment $t_1$. At the moment $t_1$, the maximum brake force K is achieved which is predetermined by the friction value between wheel 1 and road surface 2. The actual brake force K then no longer increases. A negative pulse is produced at the moment $t_1$ in the first derivative K'. The second derivative K'' of FIG. 6 illustrates that shortly thereafter the threshold S adjusted in the level switch 15 is exceeded. As a result thereof, a valve 17 arranged in the brake medium line, for example, upstream of the wheel brake cylinder, is actuated by way of an AND member 16 of conventional construction so that the pressure in the brake medium line decreases. For example, a shifting valve may be provided for that purpose which closes the supply pressure and relieves the brake cylinder. As a result of this control cycle, the pulse again drops below the threshold S so that the valve 17 is closed again. Thereafter, the next control cycle can commence.

It is appropriate for the control if the applied brake force $K_B$ is taken into consideration. For that purpose, the control magnitude obtained by one of the installations described hereinabove for detecting the applied brake force $K_B$ is applied to a differentiator 18 which produces the first derivative $K_B'$ of the control magnitude $K_B$ and supplies the same to a further level switch 19 of conventional construction. The latter produces a signal when the first derivative $K_B'$ of this control magnitude exceeds a predetermined negative value. This value is also applied to the AND member 16. The AND member 16 is therefore operated only for the control signals stemming from the actual brake force K for such length of time as the second level switch remains inoperable. It is achieved thereby that the control only responds when the brake pressure applied by the driver, i.e., the brake force $K_B$ increases or is constant but not when the brake pressure decreases. It is assured thereby that the closing of the valve 17 is assured with a stronger decrease of the applied brake force $K_B$.

Figure 7:
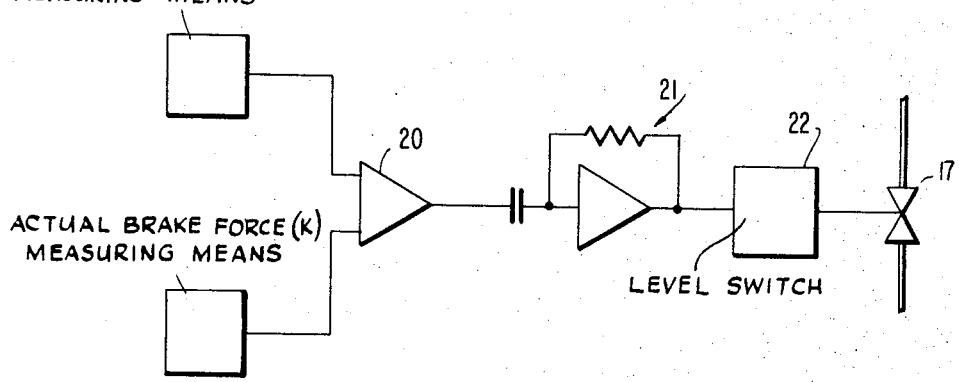
FIG. 7 is a schematic diagramatic view of a further embodiment illustrating the arrangement and construction of the control members in an installation of the present invention.
Figure 8:
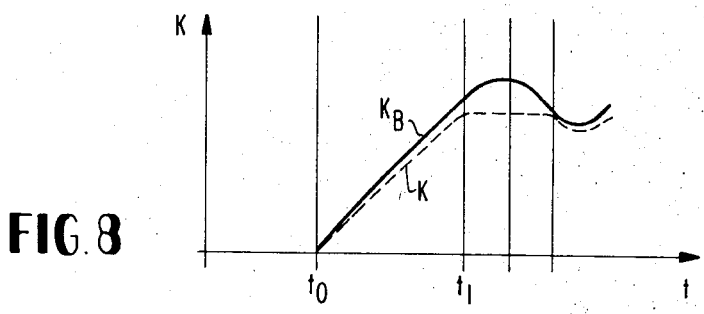
FIGS. 8 through 10 are diagrams illustrating the course of the control magnitudes of the embodiment according to FIG. 7 inclusive of the first derivative thereof.
Figure 9:
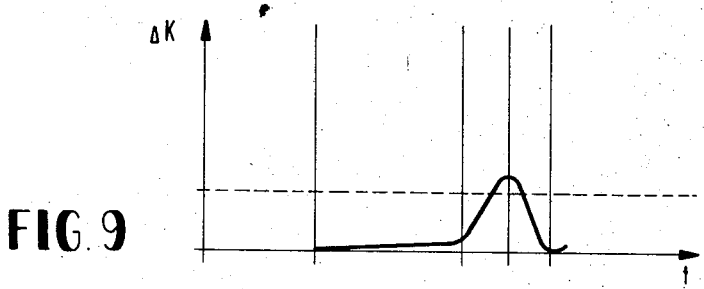
Figure 10:
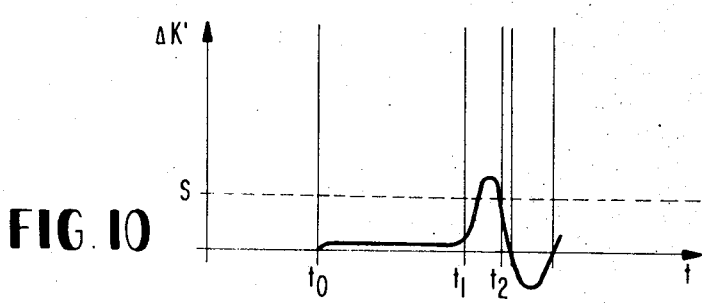

In order to reduce the number of necessary control cycles and therewith the rate of flow of brake medium and, additionally, in order to avoid far-reachingly the matching of time constants, a type of construction schematically illustrated in FIG. 7 may be provided. The difference $\Delta K$ is formed from the control magnitudes obtained from the actual brake force K and the applied brake force $K_B$. These control magnitudes are supplied for that purpose to a differential amplifier 20 of conventional construction. The obtained difference $\Delta K$ (FIG. 9) is differentiated by a first differentiator generally designated by reference numeral 21 of conventional construction into the first derivative $\Delta K'$ and supplied to a level switch 22 which is connected to a valve 17 corresponding to FIG. 3. The level switch 22 produces a signal as soon as the first derivative $\Delta K'$ (FIG. 10) of the difference $\Delta K$ exceeds a positive value S corresponding to FIG. 10. The curve of the actual brake force K and of the applied brake $K_B$ are illustrated in FIG. 8 whereas FIG. 9 illustrates the difference $\Delta K$ formed from these two control magnitudes and FIG. 10 the first derivative $\Delta K'$. If, for example, the applied brake force $K_B$ increases continuously from the moment $t_0$, then the maximum possible brake force K is reached at the point $t_1$. From that moment $t_1$, a considerable difference, i.e., a detectable difference $\Delta K$ between the applied brake force $K_B$ and the actual brake force K occurs. As a result thereof, a threshold S is exceeded in the differential quotient $\Delta K'$ after $t_1$ whereby the level switch 22 produces a signal and the valve 17 opens. Thereafter, both the applied brake force $K_B$ as also the actual brake force K becomes smaller again until at the moment $t_2$ of FIG. 10 the curve again drops below the threshold S. Thereafter the reacceleration of the wheel 1 recommences, and the brake action again starts. The next control cycle is again initiated.

The use of a differentiator 21 in front of the level switch 22 for the formation of the first derivative $\Delta K'$ of the difference $\Delta K$ is generally appropriate because the response time of the adjusting member, i.e., above all of the valves 17, is relatively large and thus an allowance for speed is necessary. Of course, it is possible to dispense with the differentiating with fast control members and to derive the threshold S directly from the difference $\Delta K$ as indicated in FIG. 9.

Figure 11:
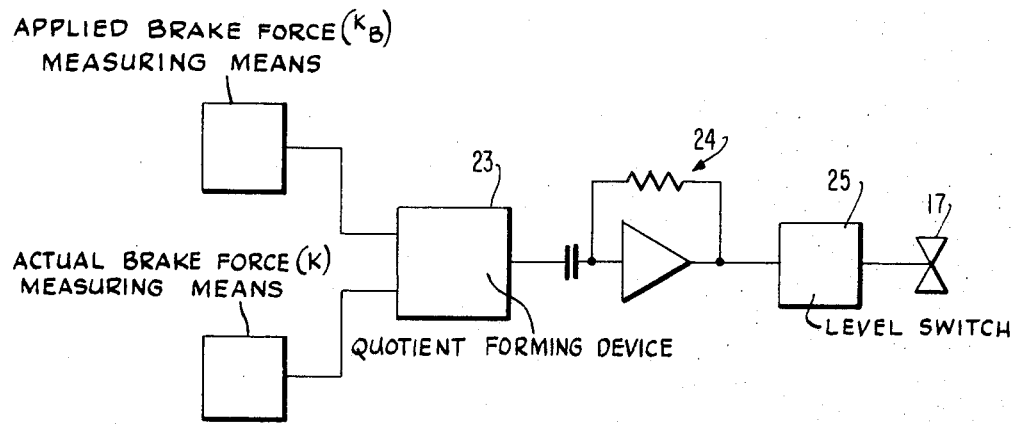
FIG. 11 is a schematic diagramatic view of a still further modified embodiment of the arrangement and use of control members in an installation according to the present invention.
Figure 12:
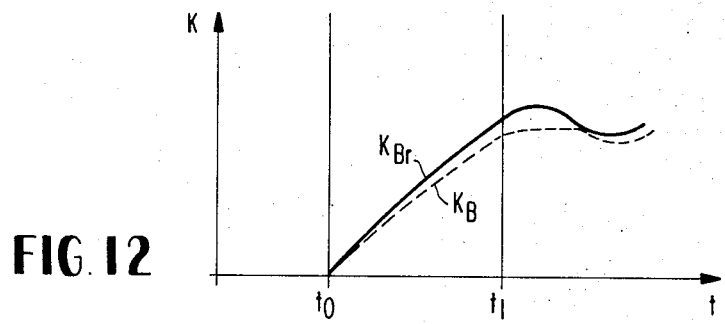
FIGS. 12 through 14 are diagrams illustrating the course of the control magnitudes inclusive of the first derivative in the embodiment of FIG. 11.
Figure 13:
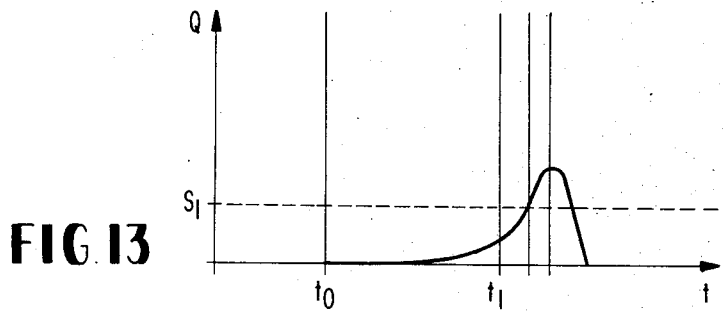
Figure 14:
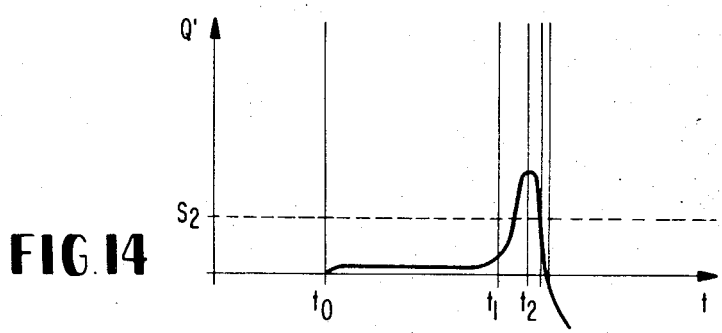

A further embodiment of the arrangement and construction of the control members is illustrated in FIG. 11 in which a quotient Q is formed from the control magnitudes obtained by the installations described above which correspond to the actual brake force K and the applied brake force $K_B$. The control magnitudes K and $K_B$ are thereby fed to a quotient-forming device 23 of conventional construction which supplies the obtained quotient Q by way of a differentiator generally designated by reference numeral 24 to a level switch 25 which is connected to a valve 17 similar to the embodiments according to FIGS. 3 and 7. Any known apparatus may be used for the quotient formation, such as electro-mechanical apparatus which operate, for example, with potentiometers. In certain cases, however, it is possible that such types of quotient-forming devices are too slow so that appropriately parabolic multipliers of conventional construction may be used. Additionally, quotient-forming devices are possible which utilize field plates, the Hall effect or optic-electronic elements of conventional, known type. It will be appropriate in most cases for a more rapid response to utilize the differentiator which forms from the quotient Q corresponding to FIG. 13, the first derivative Q' illustrated in FIG. 14. It is possible to adjust the level switch 25 either to a threshold $S_1$ corresponding to the quotient Q according to FIG. 13 or to a threshold $S_2$ corresponding to the first derivative Q' according to FIG. 14. If the brake is again actuated at a moment $t_0$, then the applied brake force $K_B$ increases steadily. The actual brake force K follows this curve up to the moment $t_1$. Consequently, the quotient Q corresponds up to the moment $t_1$ approximately to the value 1 since the differences between the actual brake force K and the applied brake force $K_B$ are only very small. After the moment $t_1$, the quotient Q, however, increases strongly. This bend appears more pronouncedly in the first derivative Q' of the quotient Q, as seen in FIG. 14.

Shortly after the instant $t_1$, the threshold $S_1$ or $S_2$ of the level switch 25 is exceeded. As a result thereof, the valve 17 is opened, and the applied brake force $K_B$ again decreases. Since the quotient Q and its first derivative Q' also decrease, the curve drops below the threshold $S_1$ or $S_2$ at the instant $t_2$ so that the valve 17 is again closed. Thereafter, a new control cycle may commence.

The arrangement according to FIG. 11 has the considerable advantage that the formed quotient is independent of the absolute magnitude of the initiated control magnitudes. As a result thereof, the control system operates equally well with a strong or a weak braking and above all is independent of the instantaneous maximum value of the brake force, i.e., also of the friction value between the wheel and road surface.

Figure 15:
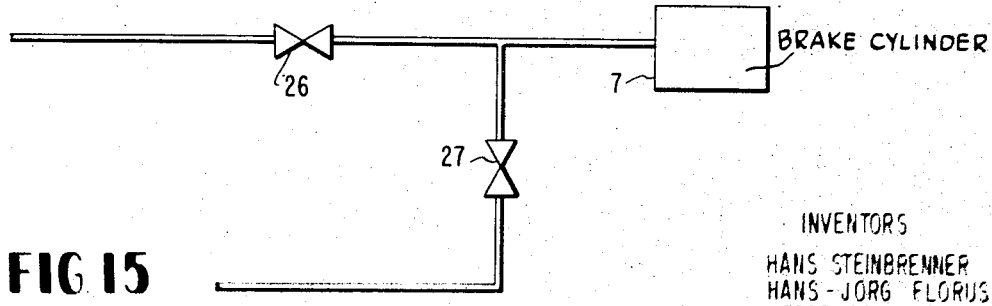
FIG. 15 is a schematic diagram illustrating a detail of a further embodiment in accordance with the present invention.

In the embodiments according to FIGS. 3, 7 and 11, only one valve 17 has been used. However, only a relatively coarse control is possible therewith. An improvement can be achieved by a three-point control in that the pressure increase is separated from the pressure decrease. As a result thereof, at least two valves 26 and 27 become necessary. In the schematic diagram according to FIG. 15, a valve 26 is provided upstream of a brake cylinder 7 which closes the pressure conducted to the brake. Additionally, a second valve 27 is present which can decrease the pressure existing at the brake on the basis of a second signal. With such an arrangement of the valve 26 and 27, two thresholds must now be predetermined or provided in the level switches 15, 19, 22 and 25 for the embodiments according to FIGS. 3, 7 and 11. A lower threshold must at first control the valve 26 so that the pressure increase is closed off. After exceeding a second threshold, the pressure is then decreased by way of the second valve 27. The number of control cycles can be reduced thereby whereas additionally a favorable approximation to the optimum value takes place.

While we have shown and described only several embodiments in accordance with the present invention, it is understood that the same is not limited thereto. In the above text, the invention has been described in the various embodiments for individual wheels. In case of simplified arrangements, also an installation for an axle may be provided. For example, one installation for the front axle alone and one installation for the rear axle whereby the average values of the individual control magnitudes can be used or whereby also an average value of a control magnitude can be derived for the entire axle. Of course, it is also possible to control only one axle alone. Furthermore, the various elements illustrated herein only schematically such as the level switches, AND circuits, differentiators, etc. are of conventional construction so that any known type may be used.

Thus, it is readily apparent that the present invention is not limited to the details shown and described herein, but is susceptible of numerous changes and modifications as known to those skilled in the art, and we therefore do not wish to be limited to the details shown and described herein but intend to cover all such changes and modifications as are within the scope of the appended claims.

We claim:

1. An installation for the control of the brakes of a vehicle, especially for preventing the locking of wheel means, which controls the pressure of a brake medium in a brake means of the wheel means, comprising first means for measuring the actual brake force between the wheel means and its road surface as occurs during the actuation of the brake means including means for producing a first control magnitude of the actual brake force, second means for measuring the applied brake force applied in the respective brake means including means for producing a second control magnitude of the applied brake force, valve means for controlling the pressure of the brake medium in the brake means, and control means having input and output means, said first and second control magnitudes being applied to the input means of said control means and the output means thereof being operatively connected with said valve means to actuate the valve means in the presence of a predetermined signal in the output means of said control means to prevent locking of the respective wheel means, said control means including differentiator means for differentiating both said first and second control magnitudes.

2. An installation according to claim 1, wherein the first means is a force-measuring cell for directly measuring the actual brake force.

3. An installation according to claim 1, wherein the first means is a displacement transmitter.

4. An installation according to claim 1, wherein the first means is built into the mounting means of the brake means.

5. An installation according to claim 4, wherein the first means is a force-measuring cell.

6. An installation according to claim 1, wherein the first means is built into the mounting means of a brake lining of the brake means.

7. An installation according to claim 6, wherein the first means is a displacement transmitter.

8. An installation according to claim 7, wherein said control means includes level switch means operatively connected with said first means and with the valve means.

9. An installation according to claim 8, wherein said control means includes comparator means operatively connected with said fist and second means.

10. An installation according to claim 9, wherein the level switch means is connected to the input of an AND circuit controlling the valve means, the other input of said AND circuit being operatively connected with a further level switch means which is operatively connected with the second means.

11. An installation according to claim 10, wherein at least one differentiator is connected ahead of the level switch means.

12. An installation according to claim 1, wherein the valve means controls the brake medium to prevent the locking of a respective wheel.

13. An installation according to claim 1, wherein the means for measuring the applied brake force is a pressure transmitter means in the brake medium line.

14. An installation according to claim 1, wherein two separately controlled valve means are arranged in the line of the brake medium.

15. An installation according to claim 14, wherein said control means includes comparator means operatively connected with said first and second means.

16. An installation according to claim 1, wherein said first and second control magnitudes are at first combined and the signal produced from such combination is differentiated in said differentiator means.

17. An installation according to claim 16, wherein said control means includes quotient forming means including input means to which are applied said first and second control magnitudes, and output means connected with said differentiator means.

18. An installation according to claim 16, wherein said control means includes differential amplifier means having input means to which are applied said first and second control magnitudes, and output means connected with said differentiator means.

19. An installation according to claim 1, wherein said differentiator means is connected with an output of each of said first and of said second means to differentiate the first and second control magnitudes separately, and wherein the control means further includes an AND element having two inputs, to which are applied the differentiated first and second control magnitudes.

20. An installation according to claim 19, wherein said first control magnitude is differentiated twice to form the second derivative prior to its application to the control means.

21. An installation according to claim 1, wherein the first means is effectively connected between a respective wheel means and a corresponding wheel support means.

22. An installation according to claim 21, wherein said second means measures the reaction force produced by the brake medium upon engagement of a respective brake means.

23. An installation for the control of brakes of a vehicle, which installation controls the pressure of a brake medium at brake means dependent on the friction value between a road surface and wheel means, characterized in that measuring means is included in wheel support means between a wheel and a fixed part of the vehicle, said measuring means responding substantially in a horizontal direction and controlling valve means arranged in a line of the brake medium in dependence on the development of the brake force, said measuring means being operatively connected with comparator means, and said comparator means being additionally operatively connected with means for detecting the applied brake force, said means for detecting the applied brake force including means for measuring the reaction force at the mounting of the brake lining.

24. An installation according to claim 23, wherein the measuring means is a force-measuring cell.

25. An installation according to claim 23, wherein the measuring means is a displacement transmitter.

26. An installation according to claim 23, wherein the installation controls the pressure of the brake medium in several brakes.

27. An installation according to claim 26, wherein the measuring means is a force-measuring cell.

28. An installation according to claim 26, wherein the measuring means is a displacement transmitter.

29. An installation according to claim 23, wherein the measuring means and the detecting means for detecting the applied brake force are operatively connected with a differential amplifier which is operatively connected by way of a level switch means with the valve means.

30. An installation according to claim 29, wherein at least one differentiator is connected ahead of the level switch means.

31. An installation according to claim 23, wherein the measuring means and the detecting means for detecting the applied brake force are operatively connected with a quotient-forming means which in turn is operatively connected with a level switch means controlling the valve means.

32. An installation according to claim 31, wherein at least one differentiator is connected ahead of the level switch means.

* * * * *